TIMING WAVE RECOVERY CIRCUIT FOR SYNCHRONOUS DATA REPEATER

Filed Dec. 28, 1966 6 Sheets-Sheet 1

INVENTORS M. A. LOGAN
H. C. SCHROEDER
BY R C Lipton
ATTORNEY

Jan. 6, 1970 M. A. LOGAN ET AL 3,488,440

TIMING WAVE RECOVERY CIRCUIT FOR SYNCHRONOUS DATA REPEATER

Filed Dec. 28, 1966 6 Sheets-Sheet 5

United States Patent Office 3,488,440

Patented Jan. 6, 1970

3,488,440

TIMING WAVE RECOVERY CIRCUIT FOR SYNCHRONOUS DATA REPEATER

Mason A. Logan, Colts Neck, and Henry C. Schroeder, East Brunswick, N.J., assignors to Bell Telephone Laboratories, Incorporated, Murray Hill, N.J.

Filed Dec. 28, 1966, Ser. No. 605,384
Int. Cl. H04l 7/04
U.S. Cl. 178—69.5 11 Claims

ABSTRACT OF THE DISCLOSURE

The phase of timing signals is compared with the phase of incoming data signals and phase corrections are made after analysis periods. The analysis periods run for seven signals bits when signals are initially received and run for fifteen signal bits when the phase of the timing signals has been corrected. If a large phase error occurs thereafter, corrections are made on a bit-by-bit basis, and in one direction, until the phase of the timing signal is corrected, as indicated by a reversal of the phase error, whereupon the fifteen signal bit analysis period is restored.

Figures 1, 6:
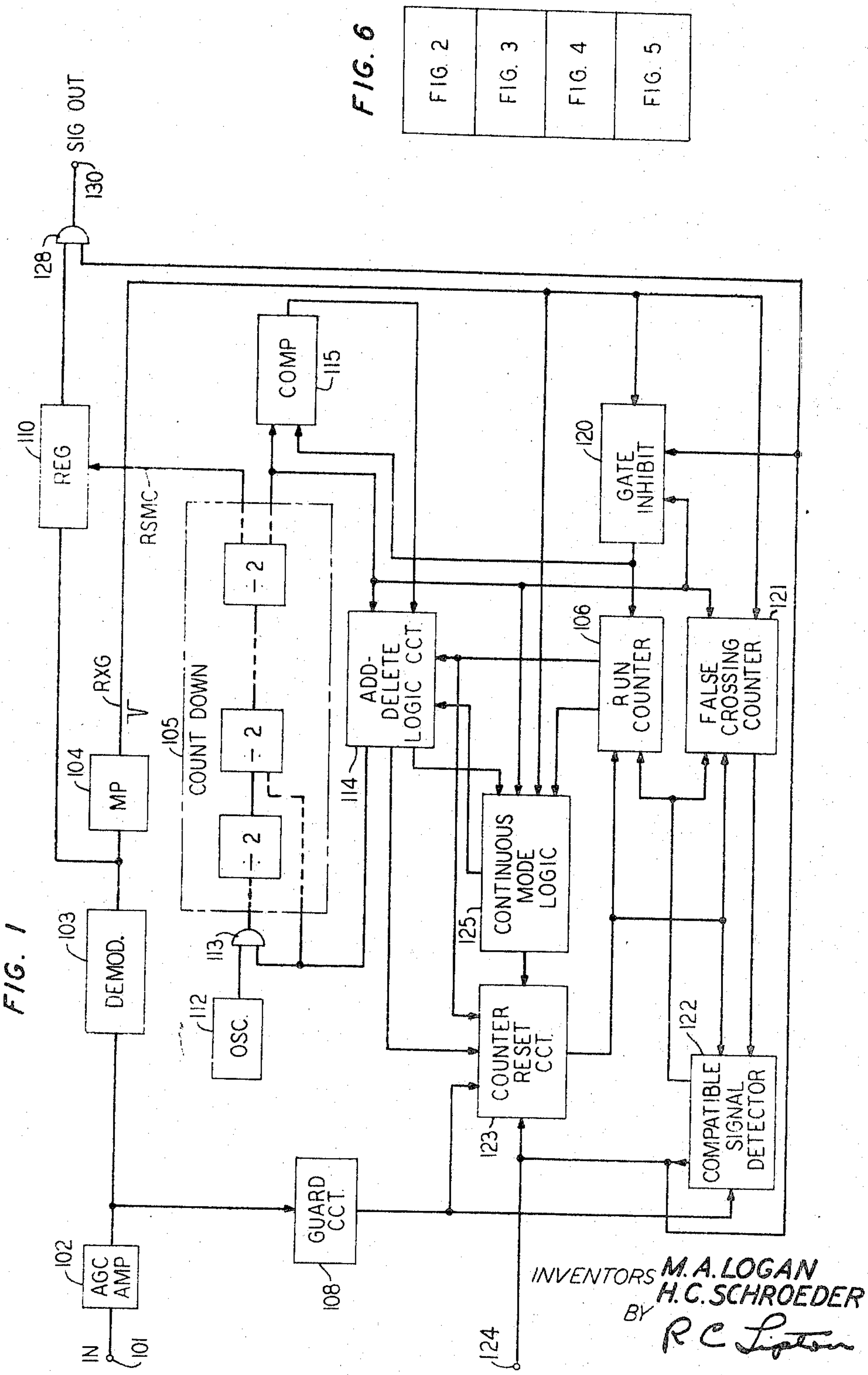

This invention relates to a timing signal recovery circuit for a synchronous data receiver and, more particularly, to a recovery circuit for maintaining a local clock circuit in phase with an incoming data bit stream.

It is a broad object of this invention to provide an improved timing signal recovery circuit.

To synchronize a local clock circuit with incoming synchronous data it is conventional to detect a significant indication of the phase of the data, such as the data bit crossovers, and compare the occurrences thereof with the clock pulses to derive directional differences of phase, if any, such as lag or lead of the phase of the clock. These comparison errors are then utilized by an adjusting circuit which advances or retards the phase of the clock, thereby synchronizing the clock with the incoming data.

The circuit conveying the incoming data may also provide channels for other forms of signaling, analogue or digital and, of course, may periodically be subject to noise. These non-compatible signals are generally filtered out or eliminated by the data set before application to the timing recovery and recording circuits therein. It is inevitable, however, that certain of the non-compatible signals will get through and any crossovers or simulations thereof may be identified as crossovers of the data stream and thus operate to modify the phase of the clock. To overcome these improper modifications, the phase comparison is preferably analyzed over a time interval and modifications are made at the termination of each interval in accordance with the analysis of the plurality of phase comparisons. A phase comparison inconsistent with the others during an analysis may then be ignored.

In systems of the above described type there is, of course, a substantial time interval between each clock correction. It is often desirable, however, to rapidly bring the clock into synchronization, such as when the receiver initially recognizes compatible data signals or where a large phase angle error exists between the phase of the clock and that of the incoming data. In addition, where the large phase angle error exists, non-compatible signals may be getting through to confuse the analyzer and result in inconsistencies in successive clock modifications.

Accordingly, it is an object of this invention to provide flexibility with respect to the rapidity of the corrections of the clock phase.

It is another object of this invention to rapidly bring the clock into phase in a recovery circuit of this type when a large phase angle error exists.

It is a further object of this invention to maintain consistent the corrections to the phase of the clock when it is rapidly being brought into phase.

In accordance with an illustrative embodiment of this invention, a run counter is provided for counting data signal intervals for producing, after a predetermined count, the above-mentioned analyzing interval. The run counter is arranged when the receiver initially recognizes compatible incoming data signals to provide a short count interval and then, after the phase of the clock is corrected, to provide a relatively long count interval.

It is a feature of this invention to modify the count interval when the difference in phase between the incoming data and the clock exceeds a predetermined phase angle. In this event the run of the counter is precluded and modifications of the phase of the clock are made on a bit-by-bit basis.

It is another feature of this invention to restore the normal analysis period operation when the clock circuit is in phase with the incoming data bit stream. Correction of the phase is determined by registering the analysis of the last normal count interval indicating either lag or lead direction phase error and thereafter indicating that the clock is in phase when a bit-by-bit analysis shows a reversal in the direction of phase error.

It is a further feature of this invention to modify the phase of the clock, when corrections are being made on the bit-by-bit basis, only in the event that the indicated direction of the phase error is the same as the registered direction provided by the last prior normal run analysis.

Figure 7:
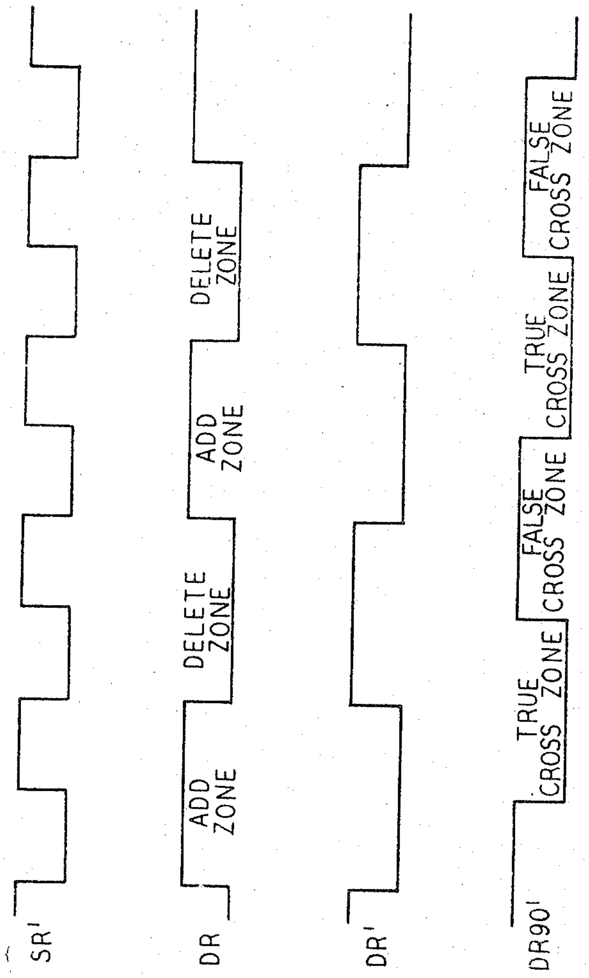

The foregoing and other objects and features of this invention will be fully understood from the following description and an illustrative embodiment thereof taken in conjunction with the accompanying drawings wherein:

FIG. 1 shows in block form the circuits and equipment which cooperate to form a data receiver utilizing a timing signal recovery circuit is accordance with this invention;

FIGS. 2 through 5, when arranged as shown in FIG. 6, illustrate the details of the circuits and equipment of the timing signal recovery circuits; and FIG. 7 discloses certain timing waves provided by the run counter.

Referring now to FIG. 1, incoming signals are received on terminal 101 from a remote transmitter. Preferably, the transmitter is of the type disclosed in Patent No. 3,128,342, which issued to P. A. Baker on Apr. 7, 1964. As disclosed in the Baker patent, serial data is converted to pairs of binary digits or dibits and phase modulated, the utilization of the dibits in accordance with the patent permitting phase shift for each bit pair, which shift being useful when the data is recovered for indicating signal transition or crossover. These signals are transmitted to the remote receiver to be received on terminal 101 and then applied to an amplifier circuit generally indicated by block 102, which circuit applies appropriate gain control.

The output of AGC amplifier 102 is extended to demodulator 103 and, in addition, to guard circuit 108. Guard circuit 108 preferably comprises an arrangement for comparing the received in-band signal level with out-of-band signals, if any, to indicate whether the incoming signals are non-data signals, such as voice or noise, or signals not compatible with the data receiver. In any event, assuming the signal threshold is satisfactory, in the absence of non-compatible or non-data signals, guard circuit 108 provides a signal condition to the output thereof indicative of this satisfactory reception.

Demodulator 103 operates together with register 110 and a clock signal applied on lead RSMC extending from countdown chain 105 to register 110 to recover the data bit stream and provide the recovered bits to gate 128, which, when enabled, passes the data bits to signal output terminal 130. A suitable arrangement for providing demodulation and registration of these phase modulated signals is disclosed in Patent No. 3,128,343, issued to P. A. Baker on Apr. 7, 1964.

The output of demodulator 103 is also extended to monopulser 104. Monopulser 104 is a conventional one shot multivibrator which operates on the data signal crossovers to provide a negative pulse, hereinafter referred to as the RXG axis crossing pulse.

The clock signal on lead RSMC is provided by countdown circuit 105. Countdown circuit 105, in turn, is driven by oscillator 112 by way of gate 113. As described in detail hereinafter, countdown circuit 105 advances through successive cycles in response to the oscillator pulses, thereby providing an output clock pulse to lead RSMC for each plurality of pulses from oscillator 112. Oscillator 112 comprises any well known high speed oscillator which provides a high frequency pulse train, which pulse train is applied to gate 113. As described hereinafter, gate 113 is controlled by add-delete logic circuit 114. This circuit is arranged to retard countdown circuit 105 by momentarily disabling gate 113 to preclude the gating of an oscillator pulse or, alternatively, to advance countdown circuit 105 by flipping a stage therein, thereby advancing the count thereof.

The primary function of countdown circuit 105 is to provide clock pulses to lead RSMC in phase with the data bit midpoint of the incoming data bit stream. Accordingly, the countdown is such that each cycle of countdown circuit 105 provides an interval equal to the interval of a data bit. In addition, the phase of countdown circuit 105 is controlled by add-delete logic circuit 114 so that each clock pulse is provided at the theoretical midpoint of the data bit element.

To determine whether the phase of countdown circuit 105 is correct relative to the incoming data bit stream, comparator 115 examines the phase cycle of countdown circuit 105 and compares it with the RXG axis crossing pulse which is applied by way of gate inhibit circuit 120 to comparator 115. Comparator 115 thus determines whether the phase of countdown circuit 105 is ahead or behind the RXG axis crossing pulse. In addition, comparator 115 ascertains if the axis crossing pulses occur more than 90° out of phase with countdown circuit 105 for reasons described hereinafter.

In general, corrections to the phase of countdown circuit 105 are made only after an analysis of a plurality of axis crossing pulses. In accordance with this emmodiment, the run analysis comprises seven events when compatible signals are initially received and fifteen events when it is determined that the phase of countdown circuit 105 haes been corrected. These determinations are made by guard circuit 108, as previously described and by compatible signal detector 122, as described hereinafter. In addition, when received signals are compatible although a significant loss of phase occurs, corrections are made on a bit-by-bit basis to rapidly bring countdown circuit 105 into phase. The count of these events, namely fifteen and seven, is provided by run counter 106.

As seen in FIG. 1, the RXG axis crossing pulse passing through gate inhibit circuit 120 is applied to run counter 106. Under the control of counter reset circuit 123 and compatible signal detector 122, run counter 106 may be in either the seven event, or short count mode; the fifteen event, or long count mode; or, alternatively, the continuous correction or bit-by-bit correction mode. The outputs of run counter 106 are provided to add-delete logic circuit 114, counter reset circuit 123 and continuous mode logic circuit 125. Run counter 106 indicates to add-delete logic circuit 114 a completion of any run count, whether in the long count, short count or continuous correction mode. In addition, run counter 106 indicates to add-delete logic circuit 114, for reasons described hereinafter, the reset of the run counter to its initial condition. The indication to counter reset circuit 123 involves the completion of a run although, as described hereinafter, this indication is effective only when run counter 106 is in the long count mode. Finally, run counter 106 indicates to continuous mode logic circuit 125 that the counter is in the continuous correction mode.

Considering now counter reset circuit 123, the functions of this circuit involve, with respect to run counter 106 and to false crossing counter 121, the latter counter to be described hereinafter, the resetting of the counters, the disabling of the reset operation thereby holding the counters in the final count state, the latter condition resulting in the continuous correction mode, or the disabling of the counters to preclude phase corrections. In addition, counter reset circuit 123 fuctions to advise compatible signal detector 122 that counters 106 and 121 are being reset, for reasons described hereinafter.

Inputs to counter reset circuit 123 include run counter 106, add-delete logic circuit 114, continuous mode logic circuit 125, guard circuit 108 and compatible signal detector 122. Considering first guard circuit 108, in the event that this circuit detects non-compatible signals, as described above, the output of guard circuit 108 goes up and counter reset circuit 123 disables counters 106 and 121, precluding corrections to the phase of countdown chain 105. With respect to add-delete logic circuit 114, assuming the output of guard circuit 108 is down, run counter reset circuit 123 initiates an immediate reset of run counter 106 and false crossing counter 121 when circuit 114 determines that no corrections are to be made to the phase of countdown chain 105. In the event that compatible signal detector 122 determines that the data is compatible and add-delete logic circuit 114 determines that corrections to the phase of countdown chain 105 are necessary, then counter reset circuit 123 provides a delay after each run of counter 106 before the reset of the counters can be effected. Alternatively, if the incoming data signals are not compatible, as determined by compatible signal detector 122, then normal resetting is precluded until continuous mode logic circuit 125 determines that the axis crossing pulses are occurring in proper phase in the manner described hereinafter. Thus, after a long count or short count analysis period corrections are provided on a bit-by-bit basis.

Considering now add-delete logic circuit 114, the input thereto, as previously described, is provided by comparator 115 and run counter 106. In addition, continuous mode logic circuit 125 signals add-delete logic circuit 114 in the event that the axis crossing pulses are being received approximately 180° out-of-phase, as described hereinafter.

In general, add-delete logic circuit 114 examines the output of comparator 115 and responds to the cycling of run counter 106 by registering, on a bit-by-bit basis, the indications as to whether the phase of countdown chain 105 leads or lags the axis crossing pulses and whether the phase error exceeds 90°. In addition, at the completion of each run of run counter 106, the results of the bit-by-bit registrations are stored in memories, the registrations and storages are analyzed and appropriate action, as described below, is thereafter taken. Reset of run counter 106 then clears out the registrations and storages. It is noted that in the continuous correction mode, wherein run counter 106 is not reset after completing a run, only the registrations are cleared, the new registration is analyzed bit-by-bit along with the memory storage provided by the last run and appropriate action is taken each cycle of countdown chain 105 whereby bit-by-bit analysis is made and bit-by-bit action is taken.

When, during a run, comparator 115 indicates that the phase of countdown chain 105 is ahead of the axis crossing pulses or, in the continuous correction, comparator 115 indicates that for the one present cycle and also for the last run the phase is ahead, add-delete logic circuit 114 provides a delete signal to gate 113 to retard the phase of coundown chain 105, as previously described.

Alternatively, when comparator 115 indicates that the phase of countdown chain 105 is behind, under the otherwise identical run or continuous correction modes, add-delete logic circuit 114 provides an add signal to gate 113 and countdown chain 105 to advance the phase. It is noted that, during the continuous correction mode, modification of the phase is made only in the event that the bit-by-bit registration conforms with the prior run memory storage. This precludes phase adjustment on the bit-by-bit basis when the single registration would operate to change the direction of the modification previously being provided by the continuous corrections. Thus, the single registration is ignored and jitter of the clock phase is reduced.

When, during a run, coundown chain 105 is substantially in phase, the axis crossing pulses usually occur both ahead and behind the clock. Thus, comparator 115 indicates both leading and lagging phases and add-delete logic circuit 114 analyzes these comparisons as not requiring a phase correction. When the phase leads and lags and, in addition, comparator 115 indicates errors of over 90° for some, but not all, of the axis crossing pulses, the received signal is considered non-coherent and no phase correction action is taken. Finally, with phase leads and lags indicated with all axis crossing pulses over 90° out-of-phase with the clock, the clock is considered approximately 180° out-of-phase and an anti-lock condition is registered to provide phase shift by simulating a delete analysis under the control of continuous mode logic circuit 125, which circuit also determined when the anti-lock condition is terminated and functions to clear the condition, as described hereinafter. With respect to the decision for no phase corrections for the correct phase clock and the non-coherent signal, it is noted that this action is passed to counter reset circuit 123 for a reset operation, as previously described.

The functions of continuous mode logic circuit 125 include terminating the continuous correction mode of run counter 106 when countdown chain 105 achieves its proper phase and setting up simulated delete indications in add-delete logic circuit 114 when the anti-lock condition occurs and thereafter terminate the anti-lock condition when the phase of countdown circuit 105 appears to be corrected.

The inputs to continuous mode logic circuit 125 are derived from add-delete logic circuit 114, countdown chain 105 and run counter 106. Run counter 106 indicates to continuous mode logic circuit 125 that the continuous correction mode is occurring. In that event, logic circuit 125 examines the RXG axis crossing pulse with respect to the phase of coundown chain 105 together with the indicated corrections to countdown chain 105 as stored in the memory register of add-delete logic circuit 114. The determination that countdown chain 105 is achieving its proper phase as a result of the corrections made by add-delete logic circuit 114 is provided when the phase of run counter 106 has been modified sufficiently so that the phase error changes from lagging to leading or vice versa. This is indicated when the phase of countdown chain 105 begins to lead the axis crossing pulse, for example, where previously add-delete logic circuit 114 registered a phase lag or add indication in the storage memory. In the event that two out of three axis crossing pulses provide these indications, continuous mode logic circuit 125 operates counter reset circuit 123 and counter reset circuit 123, in turn, terminates the continuous correction mode of run counter 106, as previously described.

Add-delete logic circuit 114 indicates the occurrence of the anti-lock condition to continuous mode logic circuit 125, as previously described. In this event, and assuming that continuous mode logic circuit 125 determines that the proper phase of countdown chain 105 has not been achieved, then logic circuit 125 impresses a simulated delete analysis in add-delete logic circuit 114. Thereafter when the proper phasing of countdown chain 105 is achieved in accordance with the examination of an RXG axis crossing pulse by continuous mode logic circuit 125, as described above, continuous mode logic circuit 125 removes the anti-lock condition previously registered in add-delete logic circuit 114.

Determination as to whether the input signal data is compatible is provided by compatible signal detector 122 which, in turn, is controlled by guard circuit 108 and by false crossing counter 121. False crossing counter 121, under control of countdown chain 105 and the RXG axis crossing pulses, provides a count of each pulse which is more than 90° out-of-phase with the clock. When false crossing counter 121 is in the short count mode, as set up by compatible signal detector 122, it indicates a reception of at least one out-of-phase RXG axis crossing pulse while run counter 106 is providing a short count run. In the long count mode, false crossing counter 121 provides an indication in the event that at least nine RXG axis crossing pulses at least 90° out-of-phase are received during one long count run of run counter 106.

Registration as to whether non-compatible data signals are being received is provided by detector 122. One input thereto is provided by guard circuit 108. When non-compatible signals are being received the output of guard circuit 108 goes up, registering this condition in detector 122. Detector circuit 122, in turn, indicates on lead CSD that non-compatible line signals are being received. This is effective to block gate 128 to preclude the output of data to terminal 130 and to apply a signal to terminal 124 whereby external circuits are signaled to raise alarms, for example. Thereafter, when guard circuit 108 indicates that compatible line signals are beginning to be received, removing the disabling condition applied to detector 122, the detector places run counter 106 and false crossing counter 121 in the previously described short count mode. The input signals are still considered to be non-compatible and, therefore, the disabling potential on lead CSD and thence to gate 128 remains to block the gate. In addition, the normal resetting of counters 106 and 121 by counter reset circuit 123 after a phase correction is made is precluded. Nevertheless, a short count run is made and if no out-of-phase RXG axis crossing pulses are detected by false crossing counter 121, the the registration of non-compatibility is removed from detector 122. Thus, the long count mode is established and the normal operation of counter reset circuit 123 is installed for normal operation. In the event, however, that one or more out-of-phase pulses are detected by counter 121, then the non-compatible registration in detector 122 remains. In this event the counters are reset for another short count run if no corrections are to be made due to non-coherency of the signal or the continuous correction mode is initiated if a phase correction action is indicated by add-delete logic circuit 114, the counters being reset for another short count run in the latter situation by continuous mode logic circuit 125, as previously described. In either event a short count run must be made without a false crossing count to remove the non-compatible registration.

With detector 122 cleared, thereby indicating the reception of compatible signals, counter reset circuit 123 is enabled to provide its normal reset operation at the conclusion of each long count run analysis, counters 106 and 121 are placed in the normal long count mode, gate 128 is enabled to pass the data signal output of register 110 to output terminal 130 and gate inhibit circuit 120 blocks the axis crossing pulses which occur at the theoretical proper phase position to avoid jitter of the phase of countdown chain 105. Thereafter, appropriate corrections, if any, are made to the phase of countdown chain 105 in accordance with the analysis of add-delete logic circuit 114, as provided by the comparisons of comparator circuit 115 during each run of run counter 106. This analysis and single correction per run continues to be made until either RXG pulses more than 90° out-of-phase with the clock are detected by false crossing counter 121 or non-compatible signals are detected by guard circuit 108. If out-of-phase pulses are detected by counter 121, coherent detector 122 again provides the non-compatible registration and precludes the resetting operation of counter reset circuit 123 when a correction is to be made, whereupon the continuous mode is re-established. The short count mode control is not re-established, however. Thus, when the normal operation is again resumed, as determined by continuous mode logic circuit 125, the counters go into the long count mode. Alternatively, if non-compatible signals are received by guard circuit 108, the running of the counters and the analysis of the phases are halted, as previously described, and the new cycle is again started from the initial condition after compatible signals are again received by guard circuit 108.

Figure 2:
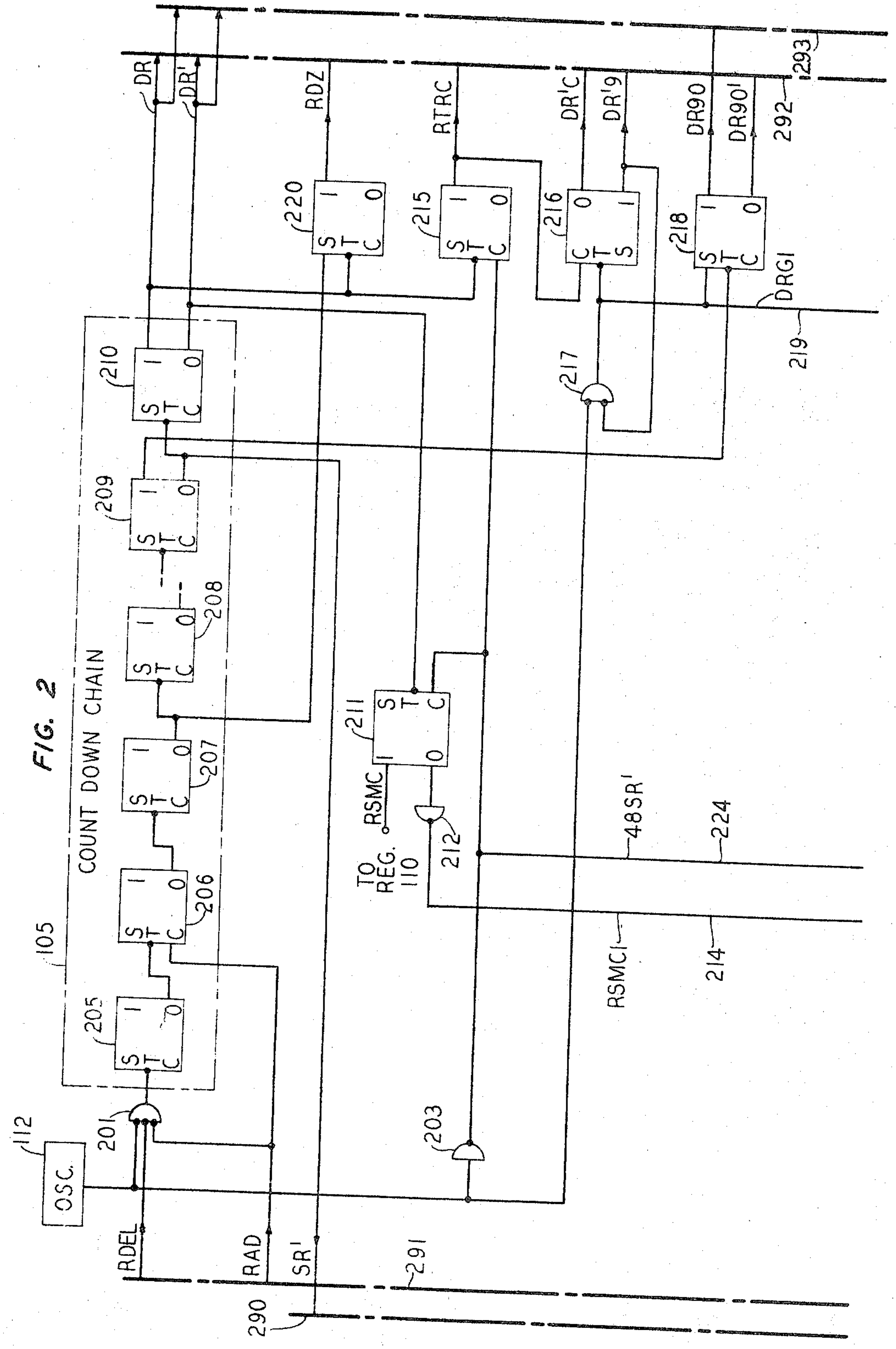

Referring now to FIGS. 2 through 5, which disclose the details of the receiver timing circuits, it is noted that certain logic circuits, such as, for example, multiple input gate 201, inverter 203 and flip flop 211 in FIG. 2, are repeatedly used in the timing circuits. Accordingly, hereinafter when an inverter is specified it will be understood that the function thereof is to produce at the output thereof a condition opposite to the input signal condition. In other words, a high condition input to an inverter, such as inverter 203, produces a low condition at the output thereof while a low condition input produces a high condition output signal. With respect to a multiple input gate, such as gate 201, the output thereof is at the low condition when one or more inputs are high. In the event, however, that all inputs thereto are in the low condition, then the output of the gate goes to the high condition. Each flip flop, such as flip flop 211, has provisions for three inputs, namely, a set input designated in the drawing adjacent to the input lead by the letter *s*, a clear input *c* and a toggle input *t*. Any positive input condition on a lead extending to the set or clear input of the flip flop drives the flip flop to the set or clear state, respectively, and maintains the flip flop in this state so long as the input condition persists. Any negative input transition on the lead connected to the toggle input flips the flip flop from one condition, set or clear, to the other condition. The flip flop has two output terminals, namely, a set or "1" output and a clear or "0" output. While in the set condition the set output terminal of the flip flop is in the high condition and the clear output terminal is in the low condition. Conversely, while the flip flop is in the clear condition the set output terminal is in the low condition and the clear output terminal is in the high condition.

Countdown chain 105, as previously described with respect to FIG. 1, is similarly designated in FIG. 2. Countdown chain 105 includes a plurality of flip flop stages connected together to provide an appropriate countdown of an incoming pulse train. Each of the stages in countdown chain 105, such as flip flops 205 through 210, normally provide a division of two. As is well-known in the art, however, feedback paths may be provided from stage to stage in countdown chain 105 to modify the specific weight of the division of each stage. In any event, a countdown or division of the incoming pulse train results whereby countdown chain 105 goes through a single cycle in response to a plurality of incoming pulses.

Countdown chain 105 is driven by the output of gate 201 and one input to gate 201 is connected to oscillator 112. As previously described, oscillator 112 provides the high frequency pulse train. The other two inputs to gate 201 extend to leads RDEL and RAD. These leads, in turn, are coupled through common cable 291 and thence, as described hereinafter, to the add-delete logic circuit 114. In the normal condition leads RDEL and RAD are in the low condition. Accordingly, gate 201 passes the output pulse train of oscillator 112 since when the pulse train goes negative the output of gate 201 goes positive with all input leads in the negative condition and when the pulse train produced by oscillator 112 goes positive, the output of gate 201 goes negative. Accordingly, in the normal condition, with leads RDEL and RAD in a low condition, each positive pulse of the pulse train produces a negative transition at the output of gate 201, which negative transition drives countdown chain 105, as described hereinafter.

The output of gate 201 extends to the toggle input of flip flop 205 in countdown chain 105. Negative transition from gate 201 thus flips the flip flop. Assuming that a cycle of countdown chain 105 is about to be initiated, all flip flops in the chain are in the clear condition and the first negative transition from gate 201 drives flip flop 205 to the set state. The clear output of flip flop 205 is thus driven to the negative condition and flip flop 206 is set. In a corresponding manner all stages in countdown chain 105 are set.

Figure 4:
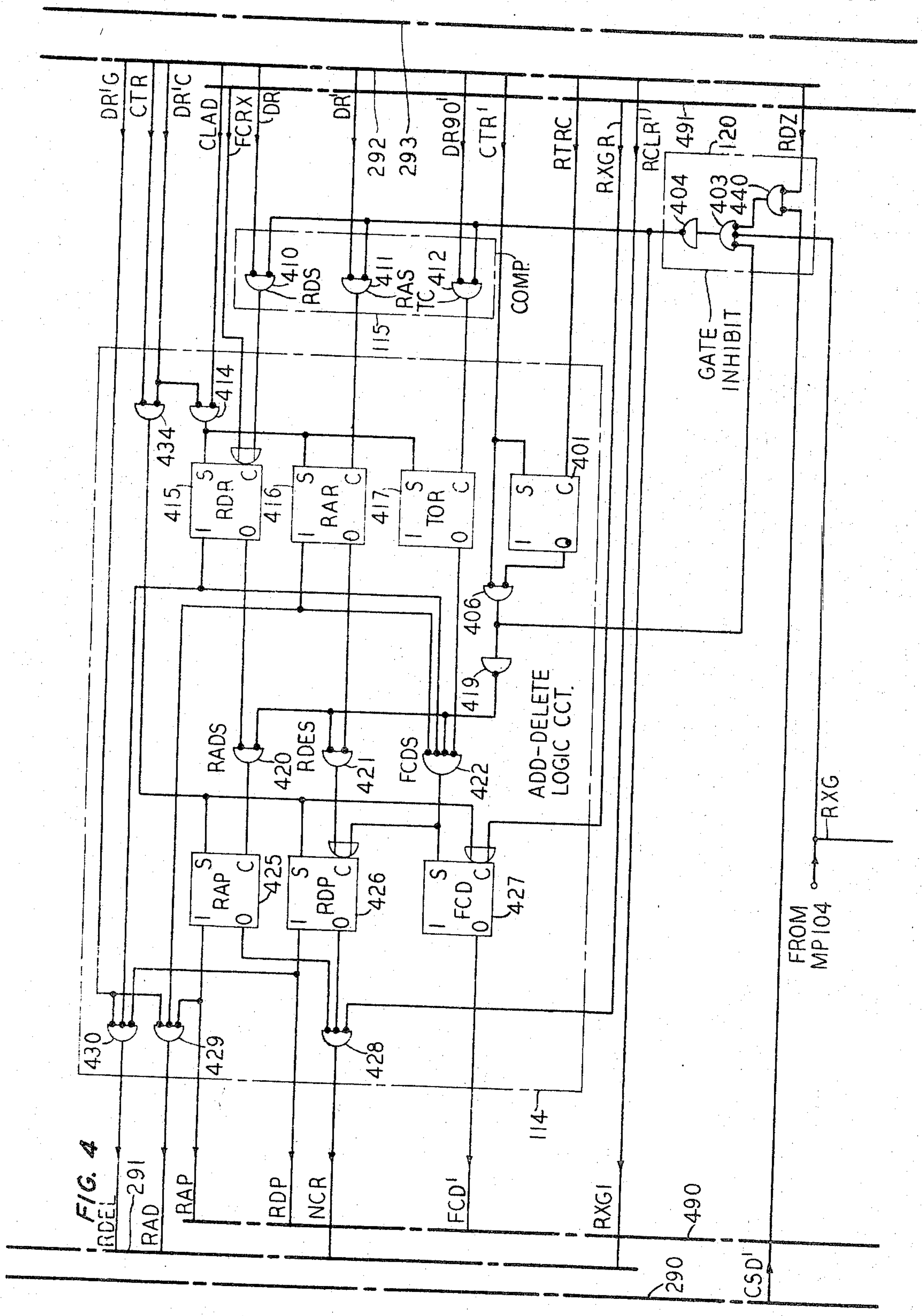

Considering now the operation of countdown chain 105 for half of a cycle, it is recalled that on the first pulse thereof all of the stages have set. The consequent setting of flip flop 210 provides a high condition at the "1" output thereof and a low output at the "0" output thereof. These conditions are applied to leads DR and DR′ to define the phase of the countdown chain. The wave on leads DR and DR′ are shown in FIG. 7, correspondingly identified as waves DR and DR′. As seen in FIG. 7, when wave DR goes to the high condition, with wave DR′ concurrently going to the low condition, at the beginning of the cycle, an add zone interval is initiated and a delete zone interval is terminated. During the cycle of countdown chain 105, when wave DR is in the high condition, the interval will hereinafter be referred to as the add zone interval and when wave DR is in the low condition, the interval will be referred to as the delete zone interval. Leads DR and DR′ extend via common cables 292 and 293 to comparator 115, whose details are shown in FIG. 4, and to continuous mode logic circuit 125, FIG. 5, to provide functions described in detail hereinafter. It is noted that, at this time, flip flop 209 is also set, driving the clear output to the low condition. This condition is applied to lead SR′ and shown in FIG. 7 as correspondingly identified wave SR′.

By the setting of flip flop 210 the consequent negative transition at the clear output thereof is passed to the toggle input of flip flop 211. As described hereinafter, flip flop 211 at this time is in the clear condition whereby the negative transition applied to the toggle input flips the flip flop to the set condition. A positive condition is thereby produced at the set output thereof and thence to lead RSMC. This provides the scanning pulse for register 110, as previously described. Concurrently therewith, the clear output of flip flop 211 goes negative. Inverter 212, which is connected to the "0" output terminal flip flop 211, thereby provides a positive transition at the output thereof. This positive transition is passed to RSMC1 lead 214 and thence to the set input of flip flop 316 and the clear input of flip flop 325 in FIG. 3. The functions of these latter flip flops will be described hereinafter. It is to be recalled, however, that the signals on leads RSMC and RSMC1 are provided upon the initiation of the countdown cycle which, as described hereinafter, occurs at the theoretical midpoint of an in-phase signal.

At the termination of the initial pulse provided by oscillator 112, a negative transition is passed to inverter 203. The output of inverter 203 is connected to the clear input of flip flops 211 and 215 and to the clear input of flip flop 303 in FIG. 3 by way of lead 224. Accordingly, flip flop 211 is restored to the clear condition. The functions of flip flops 301 and 303 will be described hereinafter.

At the midpoint of the add zone interval, which interval corresponds to the first half of the cycle, countdown chain 105 advances to the point where flip flop 209 clears. A high condition is thereby provided at the clear output terminal of flip flop 209 and thus to lead SR′, resulting in a transition in wave SR′, as seen in FIG. 7, to the high condition. Concurrently, the set output terminal of flip flop 209 goes low and this negative transition is passed to the toggle input of flip flop 218. As described hereinafter, flip flop 218 at this time is in the clear condition whereby the negative transition at the toggle input flips the state of flip flop 218 to the set condition. Accordingly, at the center of the add zone interval a positive condition is provided to the set output of flip flop 218 and then to lead DR90, and a low condition is provided to the clear output and then to lead DR90′. The wave on lead DR90′ is shown in FIG. 7 as the correspondingly identified wave DR90′. The interval when wave DR90′ is in the high condition is hereinafter referred to as a false crossing zone and the interval when the wave is low as a true crossing zone. The functions of the waves on leads DR90 and DR90′ are described hereinafter. It is noted, however, that the transition of the waves occur at the midpoint of the add and delete zone intervals.

At the end of the add zone interval, which interval terminates at the midpoint of the cycle of countdown chain 105, i.e., at the first transition of the second half of the cycle, flip flop 210 clears, reversing the conditions of leads DR and DR′. The condition of wave DR goes low and the condition of wave DR′ goes high, terminating the add zone and initiating the delete zone interval. This identifies the instant when the crossover of incoming signals should be received if they are in phase with the countdown chain clock.

When flip flop 210 clears the negative going transition at the set output terminal of flip flop 210 is passed to the toggle input of flip flop 220. Flip flop 220, as described hereinafter, is normally in the set condition whereby the negative transition to the toggle input flips the state of flip flop 220 to the clear condition. The function of flip flop 220 will be described hereinafter. It is now noted that flip flop 220 is cleared by the initiation of the second half of the countdown chain cycle. It is further noted that a fraction of a cycle thereafter, i.e., after the initiation of the second half of the countdown chain cycle, flip flop 207 in countdown chain 105 sets and the low condition produced at the clear output thereof is passed to the set input of flip flop 220, thereby restoring flip flop 220 to the set condition. Accordingly, flip flop 220 is cleared at the cycle midpoint and restored to the set condition a fraction of a cycle later.

Returning now to the clearing of flip flop 210, the previously described negative transition at the set output thereof is passed to the toggle input of flip flop 215. Flip flop 215 is normally in the clear condition and the negative transition at the input thereof drives flip flop 215 to the set condition. Since the clear input terminal is connected to inverter 203, the next pulse from oscillator 112 clears flip flop 215. This provides a positive pulse to the set output terminal and thus to output lead RTRC which is passed by way of common cable 292 to add-delete logic circuit 114. The function of the pulse on lead RTRC will be described hereinafter.

The set output terminal of flip flop 215 is also connected to the clear input of flip flop 216. Accordingly, the setting of flip flop 215 clears flip flop 216, providing a high condition to lead DR′C and a low condition to lead DR′G. The function of the signals on lead DR′G and lead DR′C will be described hereinafter.

The set output terminal of flip flop 216 is also connected to the input of gate 217. With flip flop 216 in the clear condition this input to gate 217 is therefore placed in the low condition. The other input to gate 217 extends to the input of oscillator 112. Upon the advancing of countdown chain 105, however, a pulse having a high condition is being produced by oscillator 112. At the termination of the oscillator pulse, however, the output of oscillator 112 goes to the low condition and both inputs of gate 217 are therefore in low condition. Accordingly, gate 217 produces a positive going transition at the output thereof, which positive going transition is passed to the set input of flip flop 218, insuring that the flip flop is in the set condition. In addition, the positive going transition is passed through DRG1 lead 219 to inverter 301 and the set input of flip flop 326, FIG. 3. The functions of inverter 301 and flip flop 326 will be described hereinafter.

Upon the next pulse of oscillator 112 the positive condition applied by the oscillator to gate 217 is restored and the output of gate 217 produces a negative transition. This negative transition is applied to the toggle input of flip flop 216, restoring it to the set condition. The conditions of leads DR′G and DR′C are therefore reversed and the input to gate 217 from the set output terminal of flip flop 216 is restored to the high condition. Accordingly, at the midpoint of the countdown chain cycle, when the transition from the add zone to the delete zone occurs, flip flop 215 is momentarily set and flip flop 216 is momentarily cleared, producing the above described pulse signals on leads RTRC, DR′G, DR′C and DRG1.

At the midpoint of the delete zone interval, which interval corresponds to the second half of the cycle of countdown chain 105, flip flop 209 clears and the negative transition at the set output thereof is applied to the toggle input of flip flop 218. Since, as previously described, flip flop 218 is presently in the set condition, the negative transition at the toggle input clears the flip flop, thereby reversing the conditions on leads DR90 and DR90′. This terminates the true crossing zone interval and initiates the false crossing zone interval, as seen in wave DR90′ in FIG. 7. The clearing of flip flop 209 also reverses the condition of lead SR′ and thus the condition of wave SR′, seen in FIG. 7.

Figure 3:
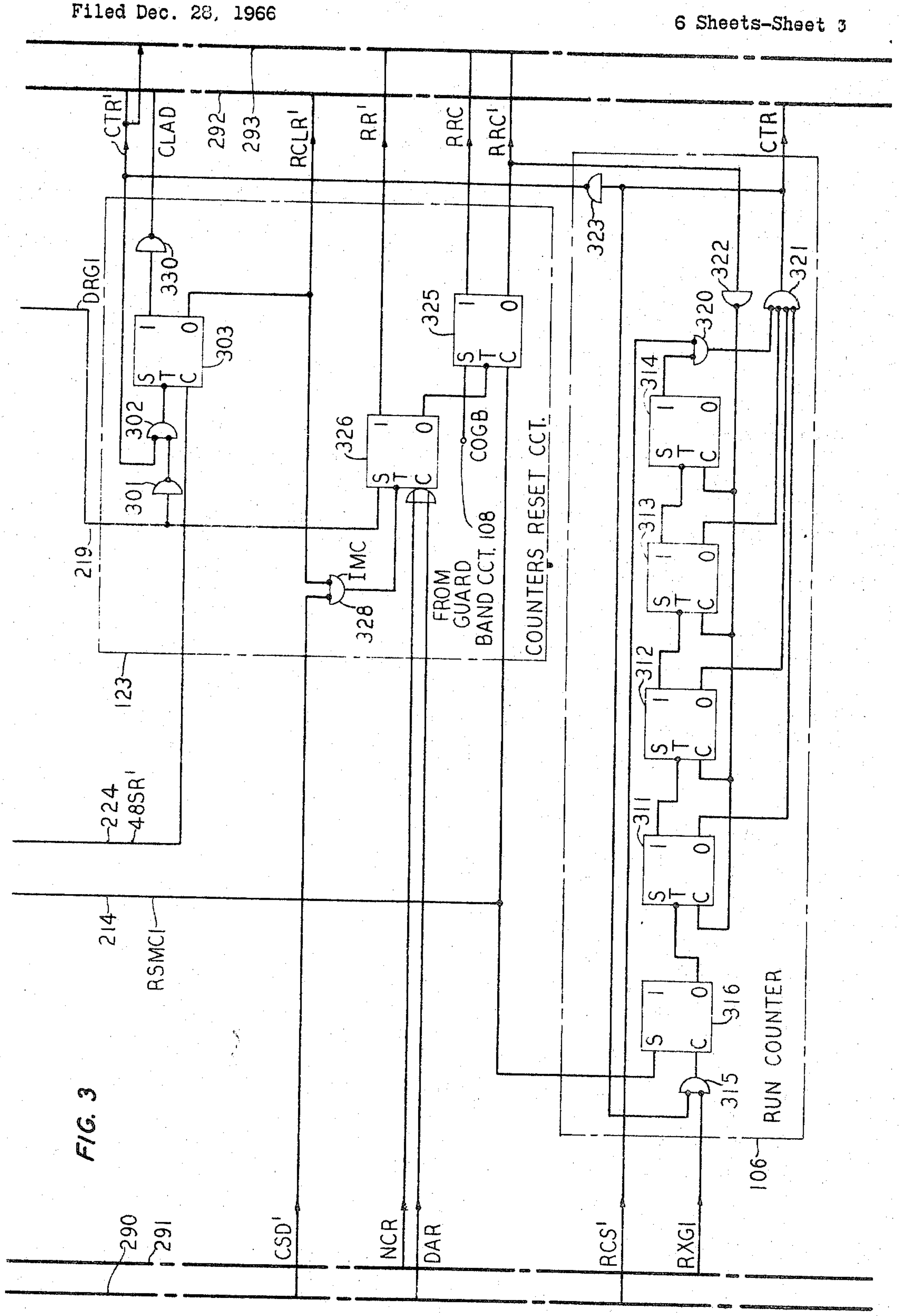

The details of run counter 106 are shown in FIG. 3. The function of run counter 106, as previously described, is to provide a count of the number of countdown chain cycles which contain RXG axis crossing pulses provided by monopulser 104 in FIG. 1, which count involves the counting of either seven or fifteen events, depending upon the condition of compatible signal detector 122, as previously described.

Referring now to FIG. 3, the count is provided by four tandem flip flops, namely, flip flops 311 through 314. The condition of compatible signal detector 122 is derived by way of lead RCS′, which extends to detector 122 by way of common cable 290.

The axis cross pulses are received over lead RXG1. Tracing back lead RXG1 from run counter 106, the path extends by way of common cable 291 to the output of inverter 404 in the gate inhibit circuit generally indicated by block 120, shown in detail in FIG. 4. The input of Inverter 404, in response thereto produces negative pulses to gate 403 is connected to lead RXG, which extends to monopulser 104 in FIG. 1 and has impressed thereon negative axis crossing pulses provided in response to the crossings of the received data signal. The other two input leads to gate 403 extend to the outputs of gate 406 and 440. As described hereinafter, the output of gate 406 is normally in the low condition with the exception of a momentary interval when a strobing operation of add-delete logic circuit 114 occurs and the output of gate 440 is normally in the low condition and with the exception of a momentary interval in the cycling of countdown chain 105 during the approximate interval when a theoretically correct axis crossing pulse could occur. Thus, gate 403 is normally enabled to pass the RXG axis crossing pulses therethrough, applying positive pulses to inverter 404. Inverter 404, in response thereto produces negative pulses on lead RXG1.

Lead RXG1 extends to the input of gate 315 in run counter 106. The other input to gate 315 extends to the output of gate 321. As described hereinafter, the output of gate 321 is up when a count has been completed and, conversely, the output of gate 321 is down when the counter has been cleared for a new count sequence or is in the midst of the counting processes.

Assuming that run counted 106 is in its initial state or in the midst of a count sequence, the output of gate 321 is down, enabling gate 315 and each of the negative axis crossing pulses applied to lead RXG1 is passed to the output of gate 315 as a positive pulse. This positive pulse is applied to the clear input of flip flop 316, which is normally in the set state due to the set input of flip flop 316 being connected to RSMC1 lead 214. As previously described, RSMC1 lead 214, which extends by way of inverter 212 to the clear output terminal of flip flop 211, has a positive pulse applied thereto at the beginning of each cycle of countdown chain 105. Thus, flip flop 316 is normally placed in the set state at the theoretical midpoint of the dibit interval of an in-phase signal and cleared in response to each RXG1 axis crossing pulse. It is noted that flip flop 316 can be cleared only once per dibit interval to reduce the sensitivity of the counter to randor pulses derived, for example, from noise.

The clear output terminal of flip flop 316 is connected to the toggle input of flip flop 311, which flip flop is the first stage of the counter. The set output terminal of flip flop 311 is connected, in turn, to the toggle input of flip flop 312 and the set output terminal of each successive counter flip flop is connected to the toggle input of the next successive counter flip flop.

As described hereinafter, the count cycle is initiated by the clearing of flip flops 311 through 314. Accordingly, the reception of the RXG1 axis crossing pulse clearing flip flop 316 and the subsequent resetting of flip flop 316 at the dibit interval midpoint provides a negative transition to the toggle input of flip flop 311 to flip the condition thereof to the set state, providing the first advance of the count. Thereafter, each subsequent RXG1 axis crossing pulse again clears flip flop 316, each advance of countdown chain 105 to initiate a new cycle thereof provides the RSMC1 pulse to set flip flop 316 and another negative transition is applied to the toggle input of flip flop 311 to flip its state and thus advance the count of run counter 106.

As previously described, run counter 106 provides a short count of seven or a long count of fifteen. This depends upon the condition of lead RCS′, which extends from compatible signal detector 122. Assuming that lead RCS′ is in the high condition, a short count of seven will be provided. Conversely, with the condition of lead RCS′ in the low condition, a long count of fifteen will be provided. Lead RCS′ extends to one input of gate 320 in run counter 106. The other input to gate 320 is connected to the set output terminal of flip flop 314. Accordingly, with lead RCS′ up the output of gate 320 is down regardless of the condition of flip flop 314. This low condition is passed to one input of gate 321.

The other three inputs to gate 321 are connected to the clear output terminals of flip flops 311 through 313. These flip flops will first attain concurrent set conditions when the counter advances to the count of seven. Thus, in the short count mode all inputs to gate 321 are down at the count of seven and the output thereof accordingly goes up.

Assuming now that a long count is to be provided and lead RCS′ is down, the output of gate 320 is up so long as flip flop 314 is in the clear condition. Accordingly, when run counter 106 advances to a count of seven, the output of gate 321 does not go up since flip flop 314 is still in the clear state. Flip flops 311 through 314 are all concurrently in the set condition when run counter 106 advances to the count of fifteen. At this time the output of gate 320 goes down and with flip flops 311 through 313 set, the output of gate 321 goes up.

When the output of gate 321 goes up, gate 315 is disabled, as previously described, blocking the RXG1 axis crossing pulses. In addition, the output of gate 321 is connected to lead CTR to produce the CTR pulse and is connected to lead CTR′ by way of inverter 323 to produce the CTR′ pulse. The functions and utilization of these pulses will be described hereinafter.

When compatible signals are being received, detector 122 places a low condition on leads RCS′ and CSD′, as described hereinafter. Lead CSD′ extends to IMC gate 328 in counter reset circuit 123, which gate is thereby enabled to pass pulses derived from the clear output of flip flop 303. Flip flop 303 is normally in the clear state and, upon the completion of a count by run counter 106, is thereupon momentarily operated to the set state to develop a negative pulse for IMC gate 328. It is noted that the clear input of flip flop 303 is connected to 48SR′ lead 224. Thus, each positive pulse from inverter 203, derived from negative pulses of oscillator 112 as previously described, provides a clearing of flip flop 303 in the event it should be operated to the set state.

The clearing of run counter 106 is provided by counter reset circuit 123, which is shown in detail in FIG. 3. Counter reset circuit 123 also resets false crossing counter 121, as described hereinafter. In general, the clearing operation is provided by flip flop 325 and flip flop 325, in turn, is controlled either by guard band circuit 108 when non-compatible signals are being received or controlled by flip flop 326. Flip flop 326 is controlled by gate 328 when corrections of phase are necessary during the normal long count mode operation of run counter 106 and controlled by conditions on leads NCR and DAR. In general, control is exercised by lead NCR, with run counter in either the long or short count mode, when no correction of the phase of countdown chain 105 is called for, and control is exercised by lead DAR when the continuous correction mode is to be terminated. It is noted that counter 106 is in the continuous correction mode when advanced to the final count and reset is precluded for various reasons described hereinafter.

As previously described, countdown chain 105 and the ancillary logic circuits shown in FIG. 2 develop a positive pulse on DRG1 lead 219 at the midpoint of the countdown chain cycle. This pulse is passed to inverter 301, whereby a negative pulse is applied from the output thereof to one input lead of gate 302. The other input lead to gate 302 is connected to the output of inverter 323. Assuming that run counter 106 has concluded a count, the output of inverter 323 is negative, as previously described, enabling gate 302 to pass the pulse provided by inverter 301. In this event, a positive pulse is applied to the toggle input of flip flop 303 and at the conclusion thereof the negative transition flips the condition of flip flop 303 to the set state since the flip flop was previously in the clear condition. The subsequent negative pulse of oscillator 112 restores flip flop 303 to the clear condition, as previously described.

The setting of flip flop 303 by the negative transition applied to the toggle input and the subsequent clearing of the flip flop in response to the next positive condition provided to the clear input results in a positive pulse at the set output thereof and a negative pulse at the clear output. The positive pulse at the set output terminal of flip flop 303 is passed to inverter 330. Accordingly, a momentary setting of flip flop 303 passes a negative pulse to lead CLAD′, the function of which will be described hereinafter.

The negative pulse provided at the "0" output terminal of flip flop 303 is passed to lead RCLR′. In addition, this negative pulse is also applied to one input of IMC gate 328. The other input to gate 328 is connected to lead CSD′, which lead is in the low condition so long as detector 122 determinates that compatible data signals are being received. Accordingly, assuming that compatible data signals are being received, the application of the negative pulse by flip flop 303 to IMC gate 328 produces a positive pulse at the output thereof, which pulse is passed to the toggle input of flip flop 326.

As described hereinafter, add-delete logic circuit 114 determines whether or not a correction of the phase of countdown chain 105 is necessary, applying a positive pulse to lead NCR when no correction is to be made. This pulse on lead NCR is provided by a strobe pulse from lead RCLR′, as described hereinafter, and the NCR pulse is therefore concurrent with the IMC pulse from gate 328, assuming no correction to the phase and compatible data being received. The positive NCR pulse, with lead NCR "Ored" into the clear input of flip flop 326, places flip flop 326 into the clear state. At the termination of the NCR pulse the IMC pulse also terminates and the negative transition of the IMC pulse applied to the toggle input of flip flop 326 restores it to the set state. The setting of flip flop 326 provides a negative transition at the clear output, which transition is applied to the toggle input of flip flop 325. Thus, with no correction required, the state of flip flop 325 is flipped at the termination of the IMC pulse.

If a correction is required, the NCR pulse is not provided and the negative transition of the termination of the IMC pulse flips the state of flip flop 326 from the normal set condition to the clear condition. Accordingly, flip flop 326, normally in the set condition, is placed in the clear condition in response to the termination of the IMC pulse produced by gate 328. The flip flop is then restored to the set condition by the DRG1 pulse on lead 219, which pulse occurs at the midpoint of the cycle of countdown chain 105. It is, therefore, apparent that when a correction is required, flip flop 326 is cleared at the midpoint of one cycle and restored to the set state at the midpoint of the next countdown chain cycle. As a result thereof, a positive condition having a duration of one countdown chain cycle is applied from the clear output of flip flop 326 to the toggle input of flip flop 325 and concurrently a negative condition is applied from the set output terminal of flip flop 326 to lead RR′. Thus, when a correction is to be made, the flipping of flip flop 325 is delayed one countdown cycle.

In the normal condition, flip flop 325 is in the clear condition due to the positive pulses produced on RMC1 lead 214, which lead extends to the clear input of flip flop 325, as previously described. This positive pulse is produced at the initiation of each countdown chain cycle. Accordingly, when flip flop 326 is restored to the set condition, the negative transition at the clear output terminal thereof always flips the condition of flip flop 325 from the clear condition to the set condition and flip flop 325 restores to the clear condition in response to the next RMC1 positive pulse on lead 214. Thus, flip-flop 325 is momentarily placed in the set condition for an interval from the approximate midpoint countdown of the chain cycle to the initiation of the next successive countdown chain cycle. Concurrently therewith, flip flop 325 provides a positive condition to lead RRC.

The flipping of flip flop 325 also produces a negative pulse at the "0" output terminal thereof, which pulse is passed to lead RRC′ and to inverter 322. Accordingly, inverter 322 passes a positive condition to the clear inputs of flip flops 311 through 314, thereby restoring run counter 106 to its initial condition. When flip flop 325 restores to the clear condition, the output of inverter 322 restores to the negative condition and with the positive condition applied to the clear inputs of flip flops 311 through 314 removed, run counter 106 is enabled to advance in response to subsequent axis crossing pulses.

In the event that non-compatible signals are being received, guard circuit 108 provides an indication, whereby a positive condition is passed to lead COGB and thence to the set input of flip flop 325. In this event, flip flop 325 is held in its set state and the negative condition is passed to inverter 322 and inverter 322, in turn, holds flip flops 311 through 314 in the cleared condition. Accordingly, run counter 106 is disabled, precluding the counting of axis crossing pulses.

If the signals being received are not compatible lead CSD′ is high, precluding the generation of the IMC pulse. In this event, upon the completion of a count by run counter 106, the counter remains in the up condition and is not reset. This condition is identified as the continuous correction mode. Corrections to the phase of countdown chain 105 are provided on a bit-by-bit basis until the axis crossing pulses appear to occur in proper phase, as determined by continuous mode logic circuit 125, whereupon, as described hereinafter, a positive pulse is received from counter mode logic circuit 125 by way of lead DAR. In the special case wherein axis crossing pulses are being received in both the add zone and the delete zone and these pulses also occur in the true crossing zone and the false crossing zone, the reception of non-coherent signals such as noise is assumed, no correction to the phase is provided and a positive pulse is received on lead NCR from add-delete logic circuit 114 to permit another run of run counter 106. Leads NCR and DAR are "Ored" to the clear input of flip flop 326. Accordingly, flip flop 326 is cleared in response to a pulse on either lead and thereafter set by the RSMC1 pulse or IMC pulse, as previously described. This flips flip flop 325 to re-cycle run counter 106 and re-initiate the operation of the counter.

The axis crossing pulses derived from inverter 404 are compared with timing pulses DR, DR′ and DR90′ derived from countdown chain 105 in comparator 115, the details of which are shown in FIG. 4. The output of comparator 115 is then fed to add-delete logic circuit 114, whose details are also shown in FIG. 4.

Tracing the output of inverter 404 to comparator 115, it is seen that the RXG1 axis crossing pulses are applied to one input of each of gates 410, 411 and 412. The other input to gate 410 extends to lead DR, while the other inputs to gates 411 and 412 are connected to leads DR′ and DR90′, respectively. Recalling now that the DR wave is negative during the second half cycle of countdown chain 105, designated the delete zone interval, and the DR′ wave is negative during the first half cycle of countdown chain 105, designated the add zone interval, it is apparent that the RXG1 pulse is passed through gate 410 in the event that it occurs during the delete zone interval and through gate 411 if it occurs during the add zone interval of the countdown chain. It is, thus, apparent that if gate 410 passes a pulse the indication is that the countdown clock is too fast, i.e., that the phase of countdown chain 105 is ahead of the axis crossing pulses. Conversely, if the axis crossing pulse is passed through gate 411, it is apparent that the clock is too slow.

The output of gate 410 is "Ored" into the clear input of RDR flip flop 415 in add-delete logic circuit 114 and the output of gate 411 extends to the clear input of RAR flip flop 416. Accordingly, RDR flip flop 415 is placed in the clear condition in the event that the clock is too fast and RAR flip flop 416 is placed in the clear condition in the event that the clock is too slow. Thus, the axis crossing pulse is compared with the cycling of countdown chain 105 with RDR flip flop 415 or RAR flip flop 416 placed in the clear condition in the event that the clock is either too fast or too slow.

As previously described, the wave on lead DR90′ is negative during the true crossing zone, an interval starting with the midpoint of the second half cycle of countdown chain 105 to the midpoint of the first half cycle. Lead DR90′ is connected to gate 412 and the gate is therefore enabled during this interval. The output of gate 412 is connected to the clear input of TCR flip flop 417. Since the RXG1 pulse is applied to gate 412, TCR flip flop 417 is cleared if the axis crossing pulse occurs in the true crossing zone.

The outputs of the conditions registered in RDR flip flop 415, RAR flip flop 416 and TCR flip flop 417 are applied to RADS gate 420, RDES gate 421 and FCDS gate 422. Gates 420 through 422 are then strobed by a pulse from inverter 419. This strobe pulse occurs after run counter 106 completes the seven or fifteen dibit interval count.

It is recalled that counter 106 advances and thus comes up, i.e., completes the count, in response to the RSMC1 pulse which, in turn, occurs at the initiation of the first half cycle of countdown chain 105. This brings the condition of lead CTR′ down. Prior thereto, while the run counter is down, lead CTR′ is positive, as previously described. With lead CTR′ connected to the set input of flip flop 401 and also to one input of gate 406, flip flop 401 is held in the set condition and the output of gate 406 is maintained in a low condition during the advance of run counter 106. The output of gate 406 is connected to input of inverter 419 and also to one input of gate 403. As the axis crossing pulses are passed through gate 403, as previously described, it is seen that gate 403 is at least partially enabled at this time, with run counter 106 in the down condition, to pass the RXG axis crossing pulses.

Returning now to flip flop 401 and gate 406, when run counter 106 completes the count, the condition of gate 321 goes up, as previously described, and the condition on lead CTR′ goes down. With flip flop 401 in the set condition and the clear output thereof connected to gate 406, the gate is enabled, causing the output of gate 406 to go positive. It is noted that gate 403 is now disabled, blocking the axis crossing pulses from run counter 106 and also from comparator 115 to prevent changing the states of registers 415 through 417 during the strobing of gates 420 through 422.

Returning now to gate 406, when the output thereof goes positive inverter 419 produces a negative pulse. This negative pulse provides the strobing of gates 420 through 422 whereby a positive pulse is produced by one of the gates in accordance with the conditions registered in flip flops 415 through 417. This output is obtained in accordance with the conditions stated in the table below:

| | State of Register | | | Output | | |
|---|---|---|---|---|---|---|
| Condition | RDR | RAR | TCR | RADS | RDES | FCDS |
| 1 | clear | clear | clear | "0" | "0" | "0" |
| 2 (anti-lock) | clear | clear | set | "0" | "0" | "1" |
| 3 | clear | set | clear | "0" | "1" | "0" |
| 4 | clear | set | set | "0" | "1" | "0" |
| 5 | set | clear | clear | "1" | "0" | "0" |
| 6 | set | clear | set | "1" | "0" | "0" |

An examination of the above table reveals that RDES gate 421 is enabled in response to the strobe pulse from inverter 419 only in the event that none of the RXG1 axis crossing signals being analyzed during the run of run counter 106 occurred during the add zone interval. This indicates that the clock output of countdown chain 105 is too fast and a delete correction is necessary. Conversely, RADS gate 420 is enabled by the strobe pulse from inverter 419 only in the event that none of the RXG1 axis crossing pulses analyzed during the cycle of run counter 106 occur during the delete zone interval to pass through RAS gate 411 in comparator 115, thereby indicating that an add correction is necessary.

The outputs of gates 420 and 421 extend to the clear inputs of RAP flip flop register 425 and RDP flip flop register 426. These flip flops comprise memory registers for storing an indication of the run count analyzation developed by gates 420 and 421 at the termination of a cycle of run counter 106. It is thus seen that RAP flip flop 425 is cleared if, in accordance with the run analysis, an add correction is called for and RDP flip flop 425 is cleared if a delete correction is called for.

In the event that during the cycle of run counter 106 RXG axis crossing pulses occur both during the add zone and the delete zone, then both registers RDR and RAR are clear, as indicated in conditions 1 and 2 of the above table. Assuming that axis crossing pulses occur, however, during the true crossing zone interval indicated in condition 1, then it is decided that no correction to the clock is necessary since the axis crossing pulses are occurring on both sides of the correct crossover point at approximately the midpoint of the cycle of countdown chain 105. Similarly, with pulses in both the add and delete zones and some but not all in the true crossing zone, the assumption is that a non-coherent signal is being received, and in accordance with condition 1 of the table, no gate output is provided to preclude any phase correction.

With the axis crossing pulses occurring during the delete and add zones and register flip flops 415 and 416 thus cleared, neither of gates 420 and 421 is enabled, as indicated by condition 1 of the above table. RAP memory register 425 and RDP memory register 426 thus remain in the set state. It is noted that since axis crossing pulses occur in the true crossing zone interval, lead DR90′ is concurrently applying an enabling condition to TC gate 412. TCR flip flop 417 is thus placed in the clear state by the enabling pulse from gate 412. The clearing of TCR flip flop 417 disables FCDS gate 422, which, as described hereinafter, registers the anti-lock condition. Thus, even though certain of the axis crossing pulses may occur in the false crossing zone interval, no correction is provided if pulses also occur in the true crossing zone interval and in both the add zone and delete zone intervals. This is to preclude clock corrections when a non-coherent signal such as noise is received resulting in pulses throughout the clock cycle.

The clear outputs of flip flops 425 and 426 are connected to two inputs of gate 428, the other input of the gate extending to lead RCLR′. As previously described, lead RCLR′ is rendered negative at the approximate midpoint of the cycle of countdown chain 105 when run counter 106 goes up after completing a run. Accordingly, gate 425 is strobed at this time and provides a positive pulse to lead NCR in the event that both registers 425 and 426 are set, indicating that no correction is required. The pulse on lead NCR is thus "Ored" into the clear input of flip flop 326, as previously described, to initiate the reset sequence for run counter 106.

Assuming now that pulses occur in both the add and delete zones during the run analysis and that, further, these pulses occur only in the false crossing zone, then both registers 425 and 426 are set, as previously described, and, in addition thereto, FCDS gate 422 is enabled, as indicated by condition 2 of the above table. This condition indicates that the axis crossing pulses are occurring approximately 180° out of phase. To correct this situation and to preclude contention between add corrections and delete corrections and thus a lock-up condition, delete corrections only are provided. With gate 422 enabled and the output thereof extending to the set input of FCD flip flop 427 and "Ored" into the clear input of RDP register 426, flip flop 427 is set and flip flop 425 is cleared. The setting of flip flop 427 indicates that axis crossing pulses are occurring only in the false crossing zone and the clearing of flip flop 426 indicates that a delete correction is required, as previously described.

The set outputs of regitsers 425 and 426 extend to leads RAP and RDP respectively and, in addition thereto, are connected to gates 430 and 429. The other inputs to gates 430 extend to the set output of RDR flip flop 415 and lead DR'G. Accordingly, gate 430 is enabled in the event that register 426 is cleared, indicating that, in accordance with the prior run analysis, a delete correction is required, and flip flop 415 is cleared, indicating that, in accordance with the running bit-by-bit analysis, an axis crossing pulse occurred in the delete zone. Accordingly, when flip flop 216 momentarily applies a negative pulse to lead DR'G at the approximate midpoint of the cycle of countdown chain 105, as previously described, gate 430 is strobed and a positive delete pulse is applied to lead RDEL. It is noted that this pulse, provided by the DR'G strobe pulse, occurs during a negative pulse of oscillator 112. Thus, with lead RDEL extending to an input of gate 201, as previously described, the output of gate 201 is maintained negative during the application of the negative pulse by oscillator 112. Accordingly, one positive output pulse of gate 201 is blocked, eliminating one negative transition to countdown chain 105, thereby deleting one count. Accordingly, the enabling of gate 430, as previously described, deletes one count of countdown chain 105.

The inputs to gate 429 include the set output of memory register 425, as previously described, the set output of flip flop 416 and lead DR'G. Accordingly, gate 429 is enabled by the strobe pulse on the DR'G lead when memory register 425 indicates that an add correction is required in accordance with the prior run analysis and flip flop 416 indicates an axis crossing pulse occurred in the add zone. In accordance therewith, a pulse is passed to lead RAD, which lead extends to one input of gate 201 and to the clear input of flip flop 206 in countdown chain 105. The RAD pulse deletes one pulse of oscillator 112 in the same manner as the RDL pulse. However, the RAD pulse also clears flip flop 206. This clearing of flip flop 206 adds a count of two to the countdown chain 105. Thus, with the count of two being added and one count being deleted, a total advance of one is provided. Accordingly, the enabling of gate 429 and the consequent pulse on lead RAD functions to advance countdown chain 105 by a count of one.

Registers 425 through 427 are restored to their initial condition by gate 434. The output of gate 434 extends to the set inputs of RAP flip flop 425 and RDP flip flop 426 and, in addition, is "Ored" to the clear input of FCD flip flop 427. Accordingly, when the output of gate 434 goes positive registers 425 and 426 are placed in the set condition and register 427 is restored to the clear condition.

The inputs to gate 434 are connected to leads CTR and DR'C. As previously described, the condition of lead CTR is negative during the interval that the output of gate 321 in run counter 106 is down. This interval is initiated when run counter 106 is restored to the initial count and proceeds until run counter 106 advances to the final count, which drives the output of gate 321 to the positive condition. Lead DR'C, it is recalled, is normally negative except for an impulse interval at the midpoint of each cycle of countdown chain 105, which impulse interval occurs concurrently with the interval wherein corrections are provided to countdown chain 105. Accordingly, both leads CTR and DR'C are negative and gate 435 is therefore enabled to restore registers 425 through 427 after run counter 106 is restored to its initial count and the correction, if any, of countdown chain 105 has been completed. Thus, registers 425 through 427 are restored for each count cycle of run counter 106 and held in the restored state until run counter 106 goes up at the conclusion of a count.

Registers 415 through 417 are restored by gate 414. The output of gate 414 is connected to the set inputs of RDR flip flop 415, RAR flip flop 416 and TCR flip flop 417. Accordingly, the enabling of gate 414 restores flip flops 415 through 417 by restoring them to the set condition.

The inputs to gate 414 extend to leads DR'C and CLAD. It is recalled that lead DR'C is negative with the exception of a momentary interval at the midpoint of each cycle of countdown chain 105. As previously described, lead CLAD is connected to the output of gate 330. Gate 330 is controlled by flip flops 303 and 325 whereby the output of gate 330 is rendered negative when either one of the flip flops is set. Since flip flop 303 is first set and then cleared during each cycle of countdown chain 105 after run counter 106 has completed its count cycle, it is apparent that gate 330 provides a negative pulse to lead CLAD once per each cycle of countdown chain 105 so long as run counter 106 has completed its count and is not restored to its initial condition.

When run counter 106 is in the long or short count mode it restores to its initial condition after the phase of the countdown chain is corrected or it is determined that no correction required. In the continuous correction mode the run counter is maintained up for corrections to be made for each dibit interval. Thus, a negative pulse is passed to lead CLAD at the conclusion of the completion of the count by run counter 106 when in the long or short count mode and a negative pulse is provided to lead CLAD for each cycle of countdown chain 105 when run counter 106 is maintained in the continuous correction mode. Accordingly, the output of gate 414 provides restoration pulses to registers 415 through 417 at the completion of each count cycle of run counter 106 and, in addition thereto, provides restoration pulses for each dibit interval when run counter 106 is in the continuous correction mode. Thus, registers 415 through 417 normally register the phase of the several axis crossing pulses occurring during the advancing of run counter 106 when the counter is in the long or short count mode and, in addition thereto, register the phase of the axis crossing pulse and are restored once for each dibit interval when run counter 106 is in the continuous correction mode. This latter function provides a fast synchronizing operation since, with run counter 106 in the continuous correction mode, registers 425 through 427 are not restored, while registers 415 through 417 continuously register each comparison made by comparator 115. Thus, for each cycling of countdown chain 105 a correction is read out by gates 429 and 430 so long as run counter 106 remains in the continuous correction mode and the zone of the pulse corresponds to registration of the previous run. This is to insure that, in the continuous correction, the rapid phase corrections may proceed only in one direction.

As previously described, when run counter 106 is in the continuous correction mode a reset thereof may be initiated by the continuous mode logic circuit 125, which is shown in detail in FIG. 4. Mode logic circuit 125 provides a positive pulse on lead DAR to reset run counter 106, as previously described. Mode logic circuit 125 provides the pulse to lead DAR when, due to the corrections to the phase of countdown chain 105, the RXG axis crossing pulses begin to occur at the proper point of the countdown chain cycle. The logic utilized by circuit 125 determines that with run counter 106 in the continuous mode and add-delete logic circuit 114 registering in the memory thereof an analysis of a prior run call for corrections of one type, add or delete, the phase of countdown chain 105 sufficiently changes whereby at least two out of three consecutive axis crossing pulses occur in the zone interval which call for corrections of the opposite type, thus indicating that the phase of the countdown chain has arrived at and is passing the proper in-phase position.

Referring now to FIG. 4, gates 504 through 510 in counter mode reset circuit 125 determine where the axis crossing pulses occur in the countdown chain cycle and check whether this corresponds to the appropriate memory registration of the required corrections stored by add-delete logic circuit 114. Gate 509 passes RXG axis crossing pulses from monopulser 104 when the phase of countdown chain 105 has been shifted sufficiently whereby the proper phase has been obtained, as determined by at least one RXG pulse occurring in the opposite zone. On the other hand, RXG axis crossing pulses are passed by gate 510 when further corrections to the phase of countdown chain 105 are necessary.

Considering first gate 509, inputs thereto, in addition to lead RXG, comprise lead CTR′, the output of gate 507 and the output of gate 508. The inputs to gate 507 comprise lead RAP and the output of gate 504. The inputs to gate 504 extend to lead RAP and lead DR. Accordingly, the output of gate 507 is up, or in the high condition, during the add zone interval of each countdown chain cycle if register 425 in add-delete logic circuit 114 is clear, showing that the prior run analysis indicated the necessity of add corrections.

Referring now to gate 508, the inputs thereof extend to lead RDP and the output of gate 506. The inputs to gate 506, in turn, are connected to leads RDP and DR′ and, in addition thereto, to the output of gate 505. Leads SR′ and FCD′ extend to the inputs of gate 505. Thus, the output of gate 508 is up during each delete zone interval if register 426 is cleared, indicating the necessity of a delete correction, or, in the alternative, the output of gate 508 is up during each add zone interval when the output of gate 505 is up, which gate goes up each false crossing portion of each add zone interval in the event that flip flop 427 is set, indicating an anti-lock condition, and, in addition to gate 505 being up, flip flop 426 is cleared, indicating the necessity of delete corrections. It is noted that the enabling of gate 508 during the false crossing portion of the add zone is provided by gate 505, which, in turn, is enabled by lead SR′ since lead SR′ is negative only during the false crossing zone portion of the add zone, as seen in the correspondingly identified wave form in FIG. 7. It is thus evident that gate 505 can be enabled only during the false crossing zone of the add zone interval.

Recalling now that the outputs of leads 507 and 508 extend to the input of gate 509 together with lead CTR′, it is thus apparent that gate 509 passes the RXG axis crossing pulses when run counter 106 is in the continuous correction mode whereby lead CTR′ is negative, as previously described, and the axis crossing pulses occur either during an add zone interval with the memory of add-delete logic circuit 114 indicating that delete corrections are necessary, or during a delete zone interval with add-delete logic circuit 114 indicating that add corrections are necessary, or during the true crossing zone portion of the add zone interval with add-delete logic circuit 114 storing the anti-lock condition.

Returning now to gate 510, which indicates that further corrections are necessary, it is seen that the inputs thereof extend to lead RXG and the outputs of gates 504 and 506. Gate 504 provides an output in the up, or high, condition during each delete zone interval of countdown chain 105 if add-delete logic circuit is indicating that add corrections are necessary. The output of gate 506 is high during each add zone interval if it be indicated that delete corrections are necessary and, further, that the anti-lock condition does not exist or the true crossing portion of the add zone interval is not occurring. Accordingly, gate 510 passes the RXG axis crossing pulses when the pulses occur either during a delete zone interval with the memory of add-delete logic circuit 114 indicating that delete corrections are necessary, or during an add zone interval with the memory indicating that add corrections are necessary, or during any zone other than the true crossing zone portion of the add zone while the memory portion of add-delete logic circuit 114 indicates the existence of the anti-lock condition.

It is recalled that the anti-lock condition analyzed by add-delete logic circuit 114 is stored therein by the setting of FCD register 427. Thus, lead FCD′ goes negative and this negative potential is applied to one input lead of gate 518 in logic circuit 125. The other input to gate 518 is connected to the output of inverter 516 which, in turn, is connected to the output of RXGC gate 510. As previously recalled, axis crossing pulses are passed by gate 510 when further corrections of the phase of countdown chain 105 are necessary. Accordingly, under this condition and when add-delete logic circuit 114 is storing the anti-lock condition, gate 518 is enabled, passing a positive condition to lead FCRX. Lead FCRX, in turn, is "Ored" into the clear input of RDR flip-flop 415. Accordingly, flip-flop 415 is cleared whereby a simulated running analysis indicating a requirement for a delete corretcion is inserted in add-delete logic circuit 114. Thus, when circuit 114 is in the anti-lock condition and additional corrections are indicated, gate 430 is enabled for each cycle of countdown chain 105 and deletions are made to retard the phase.

It is now recalled that RXG pulses are passed by RXGR gate 509 when the phase of the countdown chain is corrected. With the circuit in the anti-lock condition, the first pulse provided by gate 509 is passed to lead RXGR, which lead is "Ored" into the clear input of FCD register 427. Thus, the first RXGR pulse indicating the correction of the phase of countdown chain 105 clears flip-flop 427 to remove the anti-lock condition. The continuous mode operation of run counter 106 is continued, however, and with flip-flop 415 in the clear condition further retardation in the phase of countdown chain 105 is provided with each axis crossing pulse in the delete zone until at least two out of three consecutive RXG axis crossing pulses are in the add zone, indicating that the continuous mode operation of run counter 106 should be terminated. Similarly, with run counter 106 in the continuous correction mode due to detection of RXG pulses in the false crossing zone, as described hereinafter, and without the anti-lock condition existing since all RXG pulses occur in either the add or delete zone, the phase of clock 105 is appropriately advanced or retarded on a bit-by-bit basis until at least two out of three consecutive RXG pulses fall in the opposite zone. In either event flip-flops 513 and 515, together with gates 514, 517 and 519 and inverters 512 and 516 provide the logic to determine whether two out of three consecutive RXG axis crossing pulses are in correct phase relationship with countdown chain 105.

Initially, with the axis crossing pulses in the improper phase, gate 510 is enabled to pass these pulses, as previously described. The negative RXG pulses are thus provided at the output of gate 510 as positive RXGC pulses and at the terminal negative transition edge of the RXGC pulse flip-flop 515 is toggled from the set to the clear and then from the clear to the set conditions. In addition, the RXGC pulse is inverted by inverter 516, whereby gate 517 is enabled when flip-flop 515 is set. Thus, a positive pulse is provided at the output of gate 517 and passed to the clear input of flip-flop 513, clearing the latter flip-flop.

Assuming now that an RXG axis crossing pulse is received in proper phase, gate 509 produces a positive pulse at the output thereof. Inverter 512, in turn, provides a negative pulse and, with flip-flop 513 in the clear condition, gate 514 is enabled. The consequent positive output pulse of gate 514 thus clears flip-flop 515.

At the termination of the RXGR output pulse the negative transition thereof is applied to the toggle input of flip-flop 513, driving the flip-flop to the set condition. Thus, the RXGR pulse has cleared flip-flop 515 and set flip-flop 513.

Assuming now that the next RXG axis crossing pulse is again in proper phase, inverter 512 passes a negative pulse to gate 519. Since flip-flop 513 is presently set and the clear output thereof is connected to the other input of gate 519, the gate is enabled and a positive condition is passed to lead DAR. As previously recalled, lead DAR extends to counter reset circuit 123 and the application of the positive pulse thereof initiates the reset of run counter 106, as previously described, and, in addition thereto, the resetting of false crossing counter 121, as described hereinafter. It is noted that the DAR pulse occurs in response to the proper phase RXG pulse and thus at the midpoint of the cycle of countdown chain 105. This is 180° later in phase than the NCR pulse, precluding conflict in counter resetting when both pulses are produced. In this event, the NCR pulse controls the reset, as previously described.

In the event that the second pulse is not in phase with countdown chain 105 an RXGC pulse is produced. Accordingly, at the termination of the pulse the negative transition thereof toggles flip flop 515, driving the flip flop to the set condition. If the third pulse is again not in proper phase, the consequent RXGC pulse is inverted by inverter 516 and, with flip flop 515 now set, gate 517 is enabled to pass the pulse at the output of inverter 516. Accordingly, gate 517 clears flip flop 513 to reinitiate the cycle to the initial condition. If the third pulse is in phase, however, with flip flop 513 still set, inverter 512 pulses gate 519 since gate 519 is enabled. With flip flop 513 set, the DAR pulse is therefore produced at the output thereof.

Accordingly, it is seen that a DAR pulse is provided to counter reset circuit 123 in the event that two out of three consecutive RXG axis crossing pulses are in the zone opposite the registered indication in add-delete logic circuit 114 thus indicating that countdown chain 105 is in phase. As a result thereof, counters 106 and 121 are restored to the initial run conditions, terminating the continuous mode operation. On the other hand, if two out of three of the RXG pulses indicate that countdown chain 105 is still out of phase, the logic circuit, including flip flops 513 and 515, is restored to initiate a new count sequence.

Figure 5:
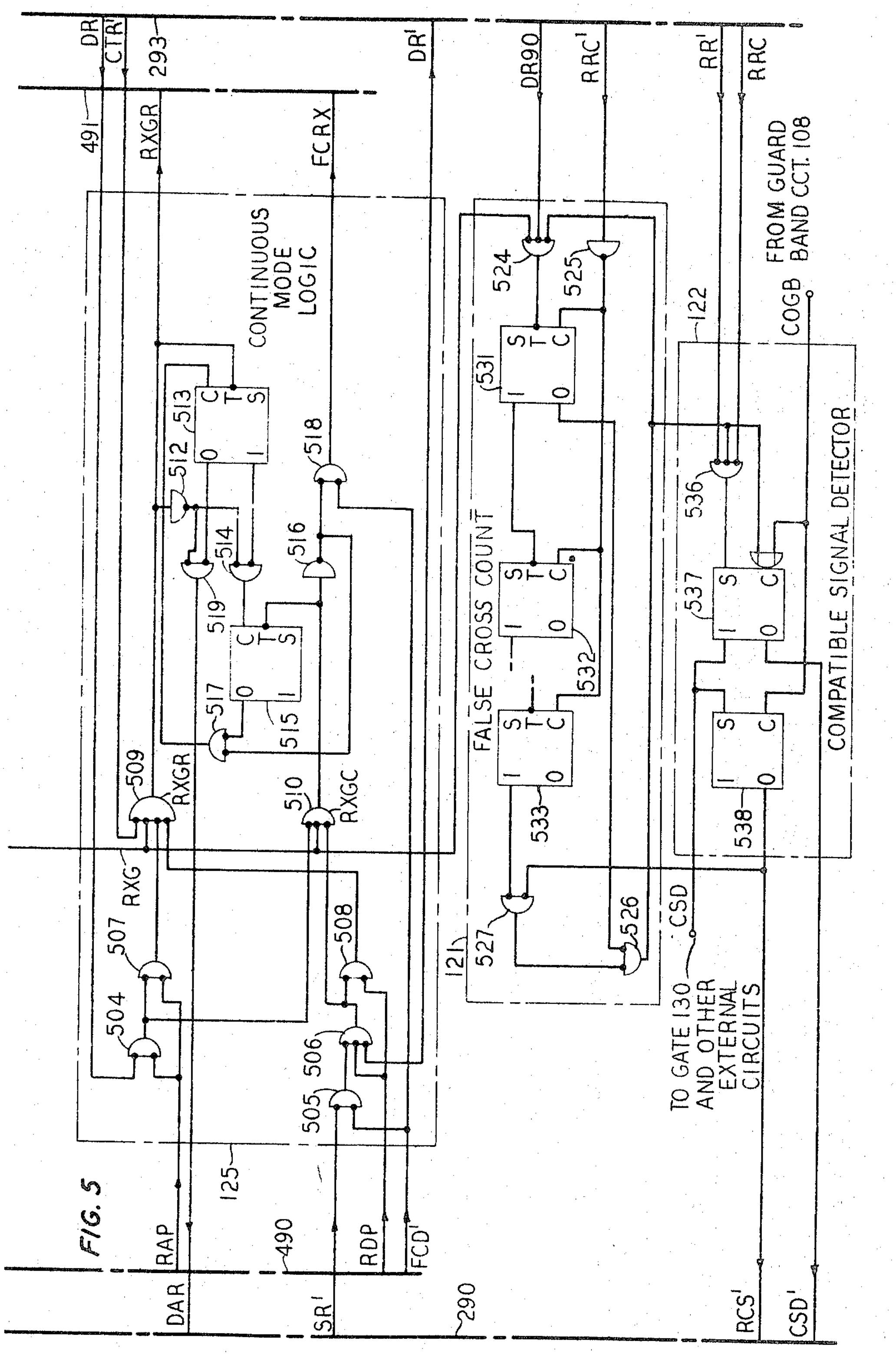

False crossing counter 121, the details of which are shown in FIG. 5, provide the function of counting the RXG axis crossing pulses occurring during the false crossing zone interval in each cycle of run counter 106. In accordance with the embodiment, false crossing counter 121 provides an indication in the event that, with run counter 106 in the long count mode, nine RXG pulses occur in the false crossing zone during any individual cycle of run counter 106. Alternatively, false crossing counter 121 indicates whether at least one RXG axis crossing pulse occurs in the false crossing zone when run counter 106 is in the short count condition.

Counter 121 in general comprises a plurality of cascaded flip flops, such as flip flops 531 through 553. It is noted that when a nine count is desired one additional intermediate flip flop is provided. In any event, inputting to the counter is provided by gate 524 whose output extends to the toggle input of flip flop 531. Gate 524 has three inputs. One input extends to lead RXG which, as previously described, provides the negative axis crossing pulses. The second input extends to lead DR90 which, as previously described, is negative during the false crossing zone. The third input is connected to the output of gate 526 which, as described hereinafter, is normally in the negative condition with the exception of the situation wherein a full count is registered by counter 121. Accordingly, gate 524 is normally enabled during the false crossing zone to pass the axis crossing pulses.

Assuming now that false crossing counter 121 is in the short count mode, as indicated by a positive condition on lead RCS′, since lead RCS′ extends to an input of gate 527 the output of gate 527 applies a negative condition to gate 526. Initially, flip flops 531 through 533 are placed in the clear condition, as described hereinafter. Accordingly, the first axis crossing pulse in the false crossing zone is passed by gate 524 to toggle flip flop 531 to the set condition. The clear output of gate 531 thus applies a negative condition to gate 526 and, with gate 527 concurrently applying a negative condition to gate 526, the output of the latter gate goes positive, indicating an excessive false crossing pulse count. This positive condition is passed to compatible signal detector 122, the details of which are shown in FIG. 5.

Assuming now that false crossing counter 121 is in the long count mode, as indicated by a low condition on lead RCS′, the output of gate 527 is in the high condition since flip flop 533 is normally in the clear state and the flip flop, together with lead RCS′, are applying negative conditions to gate 527. Thus, the output of gate 527 is high, disabling gate 526. Assuming now that axis crossing pulses in the false crossing zone are received, gate 524 toggles flip flop 531. Gate 526 is disabled, however, and the first pulse from gate 524 does not indicate a full count. After eight pulses, however, from gate 524, flip flop 533 is driven to the set condition and the output of gate 527 goes negative. The next subsequent, or ninth, pulse from gate 524 now toggles flip flop 531 to the set condition and both inputs to gate 526 are negative. Accordingly, at the count of nine the output of gate 526 goes high, indicating a full count.

False crossing counter 121 is reset concurrently with the resetting of run counter 106. The setting of flip flop 325 resets run counter 106, as previously described, and concurrently applies a negative condition to lead RRC′. This negative condition is inverted by inverter 525 and applied to the clear inputs of flip flops 531 through 533. Accordingly, the flip flops are cleared and the counter reset to its initial count condition.

Compatible signal detector 122 generates a logic signal, indicating that guard band circuit 108 detects compatible signals and that the RXG axis crossing pulses are occurring in the true crossing zone, indicating the reception of compatible data. In general, detector 122 comprises flip flops 537 and 538 and gate 536.

Assuming initially that guard band circuit 108 detects non-compatible signals, lead COGB therefrom goes to the positive condition. With lead COGB connected to the clear input of flip flop 538 and "Ored" into the clear input of flip flop 537, both flip flops go into the clear condition. The clear output of flip flop 537 goes high and the high condition on lead CSD′ indicates a loss of compatible signals. As previously described, this prepares run counter 106 for the continuous correction mode although the counter is presently disabled with lead COGB high, as previously described. In addition, with flip flop 537 cleared, the low condition on the set output lead thereof passes through inverter 530 to lead CSD to indicate to gate 130 and to external circuits the lack of compatible signal reception. With flip flop 538 in a clear condition, the clear output thereof applies a high condition to lead RCS′. This prepares run counter 106 for the short count mode, as previously described.

When compatible signals are detected by guard band 108, the condition of lead COGB goes down, run counter 106 is enabled and advances in the short count mode. Thereafter, assuming that no false crossing pulses are detected during the short count, counter 106 will be reset by the NCR pulse if the clock is in phase or by the DAR pulse when the phase is corrected. At this time, as previously described, flip flop 326 cycles. Then gate 536 is enabled since the output of gate 526 is low, the condition on lead RR′ goes low and lead RRC is normally low. A high condition is thus provided by the output of gate 536 and flip flop 537 is placed in the set condition. With the set input terminal of gate 536 connected to flip flop 537, flip flop 538 is also placed in the set condition. Accordingly, leads CSD′ and RCS′ both go to the low condition, indicating a normal long count mode. In addition, lead CSD goes to the low condition, indicating to the external circuits that compatible data signals are being received.

In the event that, when lead COGB goes down, false crossing pulses are received during the short count run, the output of gate 526 goes high, as previously described. In this event, gate 536 is disabled, precluding the recycling of detector 122 and counter 106 is thus placed in the continuous correction mode since lead CSD′ is high and the counter is up, having completed a count and not being reset. Reset can now occur by a DAR or NCR pulse. In this event, however, gate 536 is not enabled by the reset since counter 121 resets with lead RRC′ going low after lead RR′ goes up, disabling gate 536. Thus, detector 122 is not recycled, the counters remain in the short count mode, and a new short count run analysis is made. This cycling is continued until no false crossing is detected during a short count run to permit restoration to the long count mode, as described above.

Assuming, after a normal long count run, excessive false crossings, nine in this case, are received, the output of gate 526 goes high. The output of gate 526 is "Ored" into the clear input of flip flop 537. Flip flop 537 is thus cleared and lead CSD′ goes high, as does lead CSD. This indicates loss of compatible data and the high condition on lead CSD′ is applied to counter reset circuit 123 whereby, as previously described, run counter 106 goes to the continuous correction mode until reset by the DAR or NCR pulse. Thereupon, since flip flop 538 has remained set, a long count run is made and detector 122 is permitted to be recycled to the normal condition in the event that excessive false crossings are not received during the new run.

As described above, lead CSD′ goes down when compatible data is being received. Lead CSD′ extends to one input of gate 440 in gate inhibit circuit 120, the other input lead to the gate extending via lead RDZ to the set output of flip flop 220. Flip flop 220, as previously described, is momentarily cleared at the midpoint of each cycle of countdown chain 105 at approximately the interval the RXG pulse is received if the countdown chain is in phase. Thus, for this interval, when compatible data is being received, the run counter is in the normal long count mode and gate 440 is enabled to block gate 403, precluding the passage of RXG pulses to run counter 106 and comparator 115. This has the effect to eliminate jitter in the phase corrections when the phase is essentially correct.

Although a specific embodiment of this invention has been shown and described, it will be understood that various modifications may be made without departing from the spirit of this invention and within the scope of the appended claims.

What is claimed:

1. In a timing signal recovery circuit for a synchronous data receiver wherein timing signals are derived from a clock circuit capable of being retarded and advanced in phase to synchronize the timing signals with the incoming data bits and wherein, during an analysis period extending over a plurality of phase comparisons, means analyze lag and lead direction errors in the phase of the timing signals with respect to the incoming data bits and modify the phase of said clock circuit at the termination of said analysis period in accordance with said analysis, the improvement comprising means for examining the magnitude of said phase error and adjusting the duration of the analysis period in response thereto.

2. In a timing signal recovery circuit in accordance with claim 1 wherein said examining and adjusting means includes detecting means operated when the phase difference between said timing signals and said data bits exceed a selected phase angle.

3. In a timing signal recovery circuit in accordance with claim 2 wherein said detecting means is operated when a predetermined number of data bits are received during an analysis period differing in phase with said timing signals by said selected phase angle.

4. In a timing signal recovery circuit in accordance with claim 2 wherein said operated detecting means is restored to the unoperated state when the direction of the phase error of a timing signal with respect to an incoming data bit is the reverse of the direction of the phase error of the timing signal in accordance with said analysis produced during the analysis period when said detecting means is operated.

5. In a timing signal recovery circuit in accordance with claim 2 wherein said operated detecting means is restored to the unoperated state when the direction of the phase error of timing signals with respect to two out of three consecutive incoming data bits are the reverse of the direction of the phase error of the timing signal in accordance with said analysis produced during the analysis period when said detecting means is operated.

6. In a timing signal recovery circuit in accordance with claim 1 including means responsive to said examining and adjusting means for precluding the modification of said clock circuit when the direction of phase error in accordance with the analysis produced during said adjusted period differs from the direciton of phase error in accordance with the analysis produced during a prior one of said periods.

7. In a timing signal recovery circuit in accordance with claim 6 wherein said examining and adjusting means operates to change the duration of the analysis period from a normal time duration to a relatively short time duration and said prior period constitutes the last period, prior to said adjusted period, having a normal time duration.

8. In a data signal receiver of synchronous data bits which provides retimed data signals at the output thereof a timing signal recovery circuit wherein a clock circuit provides timing signals and wherein means compare the phase of the timing signals with the phase of the incoming data bits to determine the lag or lead direction of the phase error of the timing signals with respect to the data bits, the improvement comprising a compatible signal detector for precluding the operation of said data receiver, means responsive to a phase error exceeding a predetermined phase angle for operating said compatible signal detector and means for restoring said compatible signal detector to the unoperated state when the direction of the phase error of said timing signal differs from the direction of the phase error of the timing signal at the time said detector is operated.

9. In a timing signal recovery circuit for a synchronous data receiver wherein timing signals are derived from a clock circuit, means for comparing said timing signals with said incoming synchronous data to provide indications of the lag and lead direction of phase error of said timing signals, a running counter for counting a plurality of data signal intervals, means for modifying the phase of said clock circuit in accordance with the direction of said phase error after said running counter counts said plurality of intervals, means responsive to a subsequent indication of the same direction of phase error to again modify the phase of said clock circuit and means responsive to a subsequent indication of a different direction of phase error for resetting said running counter.

10. In a timing signal recovery circuit for a synchronous data receiver wherein timing signals are derived from a clock circuit capable of being retarded and advanced in phase to synchronize the timing signals with incoming data signals, means for providing lead and lag direction phase comparisons of said timing signals and data signals, means for determining a run interval having a duration of a plurality of data signal intervals, means for analyzing said phase comparisons during said run interval, means normally enabled at the termination of said run interval for modifying the phase of said clock circuit in accordance with said analysis and initiating a new run interval, and detector means operated when the phase difference between said timing signals and said incoming data signals exceeds a selected phase angle for precluding the initiation of a new run interval.

11. In a timing signal recovery circuit in accordance with claim 10, including means responsive to said analyzing means for enabling said modifying means each successive data signal interval while the initiation of the run interval is precluded by said operated detector means.

References Cited

UNITED STATES PATENTS

| | | | |
|---|---|---|---|
| 3,024,417 | 3/1962 | Secretan | 328—42 |
| 3,402,264 | 9/1968 | Ellis et al. | 178—69.5 |

ROBERT L. GRIFFIN, Primary Examiner

ROBERT L. RICHARDSON, Assistant Examiner

U.S. Cl. X.R.

325—325; 328—72